United States Patent [19]
Yoshida

[11] Patent Number: 6,088,129
[45] Date of Patent: Jul. 11, 2000

[54] FACSMILE APPARATUS

[75] Inventor: Takehiro Yoshida, Tokyo, Japan

[73] Assignee: Canon Kabushiki Kaisha, Tokyo, Japan

[21] Appl. No.: 08/772,918

[22] Filed: Dec. 24, 1996

[30] Foreign Application Priority Data

Dec. 27, 1995 [JP] Japan ................................. 7-341038

[51] Int. Cl.⁷ ............................... H04N 1/00; H04B 1/56
[52] U.S. Cl. ......................... 358/439; 358/425; 370/276
[58] Field of Search ................................. 358/439, 440,
358/434, 435, 436, 442, 444, 404, 400,
468, 463; 379/100.01, 100.06, 100.12, 100.15,
106.01, 93.07, 93.32; 370/282, 286, 296,
276, 465

[56] References Cited

U.S. PATENT DOCUMENTS

| | | | |
|---|---|---|---|
| 4,677,660 | 6/1987 | Yoshida | 379/100 |
| 4,727,576 | 2/1988 | Yoshida | 379/100 |
| 4,953,210 | 8/1990 | McGlynn et al. | 380/48 |
| 5,189,696 | 2/1993 | Yoshida | 379/355 |
| 5,255,311 | 10/1993 | Yoshida | 379/100 |
| 5,585,939 | 12/1996 | Yoshida | 358/438 |
| 5,692,040 | 11/1997 | Greenblatt | 379/350 |
| 5,717,744 | 2/1998 | Yoshida | 379/100 |
| 5,721,731 | 2/1998 | Yoshida | 370/296 |
| 5,726,765 | 3/1998 | Yoshida | 358/412 |
| 5,732,104 | 3/1998 | Brown et al. | 375/222 |
| 5,751,441 | 5/1998 | Morimoto | 358/435 |
| 5,751,796 | 5/1998 | Scott | 379/93.31 |
| 5,835,538 | 11/1998 | Townshend | 375/295 |
| 5,844,940 | 12/1998 | Goodson et al. | 375/222 |
| 5,859,872 | 1/1999 | Townshend | 375/242 |

*Primary Examiner*—Madeleine Nguyen
*Attorney, Agent, or Firm*—Fitzpatrick, Cella, Harper & Scinto

[57] ABSTRACT

To prevent the reduction of an S/N ratio of an image signal in the ITU-T Recommendation V.34 half-duplex communication, signal level designation information included in a line probing signal is disregarded or "no signal level attenuation" information is informed to a partner station when the half-duplex communication is conducted.

4 Claims, 15 Drawing Sheets

FIG. 8

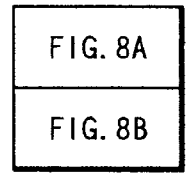

FIG. 8A

BIT DEFINITION FOR INFO0 SEQUENCE

| INFO0 BIT LSB:MSB | DEFINITION |
|---|---|
| 0:3 | FILL-BIT "111" |
| 4:11 | FRAME SYNC "01110010" (THE LEFTEST IS LEADING) |
| 12 | "1":SYMBOL TRANSMISSION RATE 2743 IS SUPPORTED |
| 13 | "1":SYMBOL TRANSMISSION RATE 2800 IS SUPPORTED |
| 14 | "1":SYMBOL TRANSMISSION RATE 3429 IS SUPPORTED |
| 15 | "1":FACULTY OF SENDING BY LOW FREQ CARRIER AT RATE 3000 |
| 16 | "1":FACULTY OF SENDING BY HIGH FREQ CARRIER AT RATE 3000 |
| 17 | "1":FACULTY OF SENDING BY LOW FREQ CARRIER AT RATE 3200 |
| 18 | "1":FACULTY OF SENDING BY HIGH FREQ CARRIER AT RATE 3200 |
| 19 | "0":NO FACULTY OF SENDING AT RATE 3429 |
| 20 | "1":FACULTY OF CONTROLLING SENDING POWER BELOW NORMAL SET LEVEL |

FROM FIG. 8A

| | |
|---|---|
| 21:23 | MAX ALLOWANCE FOR DIFFERENCE BETWEEN SENDING AND RECEIVING RATES IS INDICATED BY 0 TO 5 AS DIFFERENCE IN NUMBER OF STEPS |
| 24 | INF00 SEQUENCE SENT FROM CME MODEM IS SET AS "1" |
| 25 | RESERVED (THIS BIT IS SET TO "0" BY ORIGINATE-MODEM, BUT NEGLECTED BY ANSWER-MODEM) |
| 26:27 | SENDING-CLOCK SOURCE (0:INTERNAL, 1:SYNC WITH RECEIVE TIMING, 2:EXTERNAL, 3:RESERVED) |
| 28 | "1" IS SET BY CONFIRMATION OF CORRECT RECEPTION OF INF00 FRAME DURING ERROR RECOVERY PROTOCOL |
| 29:44 | CRC |
| 45:48 | FILL-BIT "1111" |

NOTE: BIT 12 TO BIT 14 ARE SET TO INDICATE FACULTY AND/OR SETTING OF MODEM.
BIT 15 TO BIT 20 ARE SET FOR ADJUSTMEMT REQUEST AND APPLIED FOR SENDING UNIT OF MODEM.
NOTE: BIT 24 MAY BE USED IN ASSOCIATION WITH GSTN ACCESS PARTITION DEFINED IN RECOMMENDATION V.8 TO DETERMINE OPTIMUM PARAMETERS FOR SIGNAL CONVERTER AND ERROR CONTROL IN ORIGINATE-MODEM, ANSWER-MODEM AND CME MODEM.

FIG. 9

| FIG. 9A |
|---------|
| FIG. 9B |

FIG. 9A

BIT DEFINITION FOR INFO1c SEQUENCE

| INFO1c BIT LSB:MSB | DEFINITION |
|---|---|
| 0:3 | FILL-BIT "1111" |
| 4:11 | FRAME SYNC "01110010" (THE LEFTEST IS LEADING) |
| 12:14 | MIN ATT VALUE (0 TO 7 dB) REQUESTED BY ANSWER-MODEM IS SET. IF INFO0a INDICATES NO FACULTY OF POWER CONTROL IN ANSWER-MODEM, 0 IS SET. |
| 15:17 | ADDITIONAL ATT VALUE (0 TO 7 dB) PERMISSIBLE IN ORIGINATE-MODEM IS SET. IF INFO0a INDICATES NO FACULTY OF ADDITIONAL POWER CONTROL IN ANSWER-MODEM, 0 IS SET. |
| 18:24 | LENGTH OF MD SENT BY ORIGINATE-MODEM IN PHASE 3 IS INDICATED BY 0 TO 127 IN UNITS OF 35ms |
| 25 | "1":HIGH-FREQ CARRIER IS USED FOR TRANSMISSION FROM ANSWER-MODEM TO ORIGINATE-MODEM AT RATE 2400 |
| 26:29 | PRE-EMPHASIS FILTER USED FOR TRANSMISSION FROM ANSWER-MODEM TO ORIGINATE-MODEM IS INDICATED BY 0 TO 10 |
| 30:33 | MAX PROJECTION DATA TRANSMISSION RATE FOR 2400 SYMBOLS/S IS INDICATED BY 0 TO 12 AS MULTIPLE RATE OF 2400 BIT/S. 0:SYMBOL RATE IS NOT AVAILABLE. |

FROM FIG. 9A

| | |
|---|---|
| 34:42 | PROBING RESULT INDICATES RATE 2743 AS OPTIMUM. CODING IS SAME AS THAT OF BITS 25-33. |
| 43:51 | PROBING RESULT INDICATES RATE 2800 AS OPTIMUM. CODING IS SAME AS THAT OF BITS 25-33. |
| 52:60 | PROBING RESULT INDICATES RATE 3000 AS OPTIMUM. CODING IS SAME AS THAT OF BITS 25-33 THIS FIELD HAS TO CONFORM WITH FACULTY OF ANSWER-MODEM INDICATED BY INFOa |
| 61:69 | PROBING RESULT INDICATES RATE 3200 AS OPTIMUM. CODING IS SAME AS THAT OF BITS 25-33 THIS FIELD HAS TO CONFORM WITH FACULTY OF ANSWER-MODEM INDICATED BY INFOa |
| 70:78 | PROBING RESULT INDICATES RATE 3429 AS OPTIMUM. CODING IS SAME AS THAT OF BITS 25-33 THIS FIELD HAS TO CONFORM WITH FACULTY OF ANSWER-MODEM INDICATED BY INFOa |
| 79:88 | FREQ OFF-SET OF PROBING TONE AT ORIGINATE-MODEM IS SET. OFF-SET VALUE IS REPRESENTED AS DIFFERENCE BETWEEN RECEIVED TONE (1050Hz) AND SENDING TONE (1050Hz) BY -511 TO 511 (COMPLEMENT-BINARIZED) IN UNITS OF 0.02Hz. SINCE OFF-SET 0.25Hz CANNOT BE REPRESENTED PRECISELY, IT IS SET AS -512 INDICATING NEGLECT OF THIS FIELD. |
| 89:104 | CRC |
| 105:108 | FILL-BIT "1111" |

FIG. 10

| FIG. 10A |
|---|
| FIG. 10B |

FIG. 10A

BIT DEFINITION FOR INF01a SEQUENCE

| INF01a BIT LSB:MSB | DEFINITION |
|---|---|
| 0:3 | FILL-BIT "1111" |
| 4:11 | FRAME SYNC "01110010" (THE LEFTEST IS LEADING) |
| 12:14 | MIN ATT VALUE (0 TO 7 dB) REQUESTED BY ORIGINATE-MODEM IS SET. IF INF00c INDICATES NO FACULTY OF POWER CONTROL IN ORIGINATE-MODEM, 0 IS SET. |
| 15:17 | ADDITIONAL ATT VALUE (0 TO 7 dB) PERMISSIBLE IN ANSWER-MODEM IS SET. IF INF00c INDICATES NO FACULTY OF ADDITIONAL POWER CONTROL IN ORIGINATE-MODEM, 0 IS SET. |
| 18:24 | LENGTH OF MD SENT BY ANSWER-MODEM IN PHASE 3 IS INDICATED BY 0 TO 127 IN UNITS OF 35ms |
| 25 | "1":HIGH-FREQ CARRIER IS USED FOR TRANSMISSION FROM ORIGINATE-MODEM TO ANSWER-MODEM. THIS HAS TO CONFORM WITH FACULTY OF ORIGINATE-MODEM INDICATED BY INF00c |
| 26:29 | PRE-EMPHASIS FILTER USED FOR TRANSMISSION FROM ORIGINATE-MODEM TO ANSWER-MODEM IS INDICATED BY INTEGER 0 TO 10. |

FROM FIG. 10A

| | |
|---|---|
| 30:33 | MAX PROJECTION DATA TRANSMISSION RATE FOR SELECTED SYMBOL RATE IS INDICATED BY 0 TO 12 AS MULTIPLE RATE OF 2400 BIT/S. |
| 34:36 | SYMBOL RATE USED FOR TRANSMISSION FROM ANSWER-MODEM TO ORIGINATE-MODEM IS INDICATED BY 0 TO 5 THIS RATE HAS TO CONFORM WITH INFORMATION OF INF01c AND RATE INDICATED BY INF00a AND INF00c. CARRIER FREQ AND PRE-EMPHASIS FILTER ARE ALREADY INDICATED IN INF01c. |
| 37:39 | SYMBOL RATE USED FOR TRANSMISSION FROM ORIGINATE-MODEM TO ANSWER-MODEM IS INDICATED BY 0 TO 5. INDICATED RATE HAS TO CONFORM WITH FACULTY INDICATED BY INF00a AND RATE INDICATED BY INF00a AND INF00c |
| 40:49 | FREQ OFF-SET OF PROBING TONE AT ANSWER-MODEM IS SET. OFF-SET VALUE IS REPRESENTED AS DIFFERENCE BETWEEN RECEIVED TONE (1050Hz) AND SENDING TONE (1050Hz) BY -511 TO 511 (COMPLEMENT-BINARIZED) IN UNITS OF 0.02Hz. SINCE OFF-SET 0.25Hz CANNOT BE REPRESENTED PRECISELY, IT IS SET AS -512 INDICATING NEGLECT OF THIS FIELD. |
| 50:65 | CRC |
| 66:69 | FILL-BIT "1111" |

FIG. 12

BIT DEFINITION FOR INFOh SEQUENCE

| INFOh BIT LSB:MSB | DEFINITION |
|---|---|
| 0:3 | FILL-BIT "1111" |
| 4:11 | FRAME SYNC "01110010" (THE LEFTEST IS LEADING) |
| 12:14 | ATT VALUE (0 TO 7 dB) REQUESTED BY ANSWER-MODEM IS SET. IF INFO0 INDICATES NO FACULTY OF POWER CONTROL IN ORIGINATE-MODEM, 0 IS SET. |
| 15:21 | LENGTH OF TRN SENT BY ORIGINATE-MODEM IN PHASE 3 IS INDICATED BY 0 TO 127 IN UNITS OF 35ms. |
| 22 | "1":HIGH FREQ CARRIER IS USED FOR DATA TRANSMISSION. THIS HAS TO CONFORM WITH FACULTY OF ORIGINATE-MODEM INDICATED BY INFO0. |
| 23:26 | PRE-EMPHASIS FILTER USED FOR TRANSMISSION FROM ORIGINATE-MODEM TO ANSWER-MODEM IS INDICATED BY 0 TO 10. |
| 27:29 | SYMBOL RATE USED FOR DATA TRANSMISSION IS INDICATED BY 0 TO 5. |
| 30 | "1":16-POINT CONSTELLATION TRN, "0":4-POINT CONSTELLATION TRN |
| 31:46 | CRC |
| 47:50 | FILL-BIT "1111" |

FACSMILE APPARATUS

BACKGROUND OF THE INVENTION

1. Field of the Invention

The present invention relates to a facsimile apparatus, and more particularly to a facsimile apparatus having the V.34 communication function of the ITU-T Recommendation.

2. Related Background Art

No prior art G3 facsimile apparatus can designate a signal send level from a receiver to a transmitter. However, it can designate a power suppression amount from the receiver to the transmitter after the reception of a line probing signal in each of half-duplex and full-duplex communications of the V.34 of the ITU-T Recommendation. The designation of the power suppression amount means the downward designation of the signal send level of the transmitter.

The V.34 of the ITU-T Recommendation (hereinafter referred to as V.34) communication includes half-duplex operating procedures and duplex operating procedures for the data transmission. The duplex operating procedures are mainly used for the computer data transmission. The half-duplex operating procedures are used for the facsimile data transmission.

When the power suppression amount information is sent from the receiver to the transmitter, the transmitter always suppresses the power in accordance with the designated information and sends a data signal. However, in the half-duplex communication, when the data signal is sent while the power thereof is suppressed, it is difficult to secure a S/N ratio at the receiver and the transmission speed must be slow down in order to attain the correct data transmission.

On the other hand, since the prior art V.34 receiver commands the transmitter t attenuate the level to a lowest receivable level even in the half-duplex communication as it is in the full-duplex communication, the transmission speed is slowed down by the reason described above.

SUMMARY OF THE INVENTION

It is an object of the present invention to improve a facsimile apparatus.

It is another object of the present invention to prevent the deterioration of the S/N ratio due to the suppression of a power of a data signal when data is transmitted in the half-duplex operation procedures in an ITU-T recommendation V.34 facsimile apparatus.

BRIEF DESCRIPTION OF THE DRAWINGS

FIG. 8 is comprised of FIGS. 8A and 8B showing procedures of the V.34.

FIG. 9 is comprised of FIGS. 9A and 9B showing procedures of the V.34.

FIG. 10 is comprised of FIGS. 10A and 10B showing procedures of the V.34.

FIG. 12 shows procedures of the V.34.

DETAILED DESCRIPTION OF THE PREFERRED EMBODIMENTS

[Embodiment 1]

Embodiment 1 of the present invention is now explained in detail with reference to the drawings.

Figure 1:
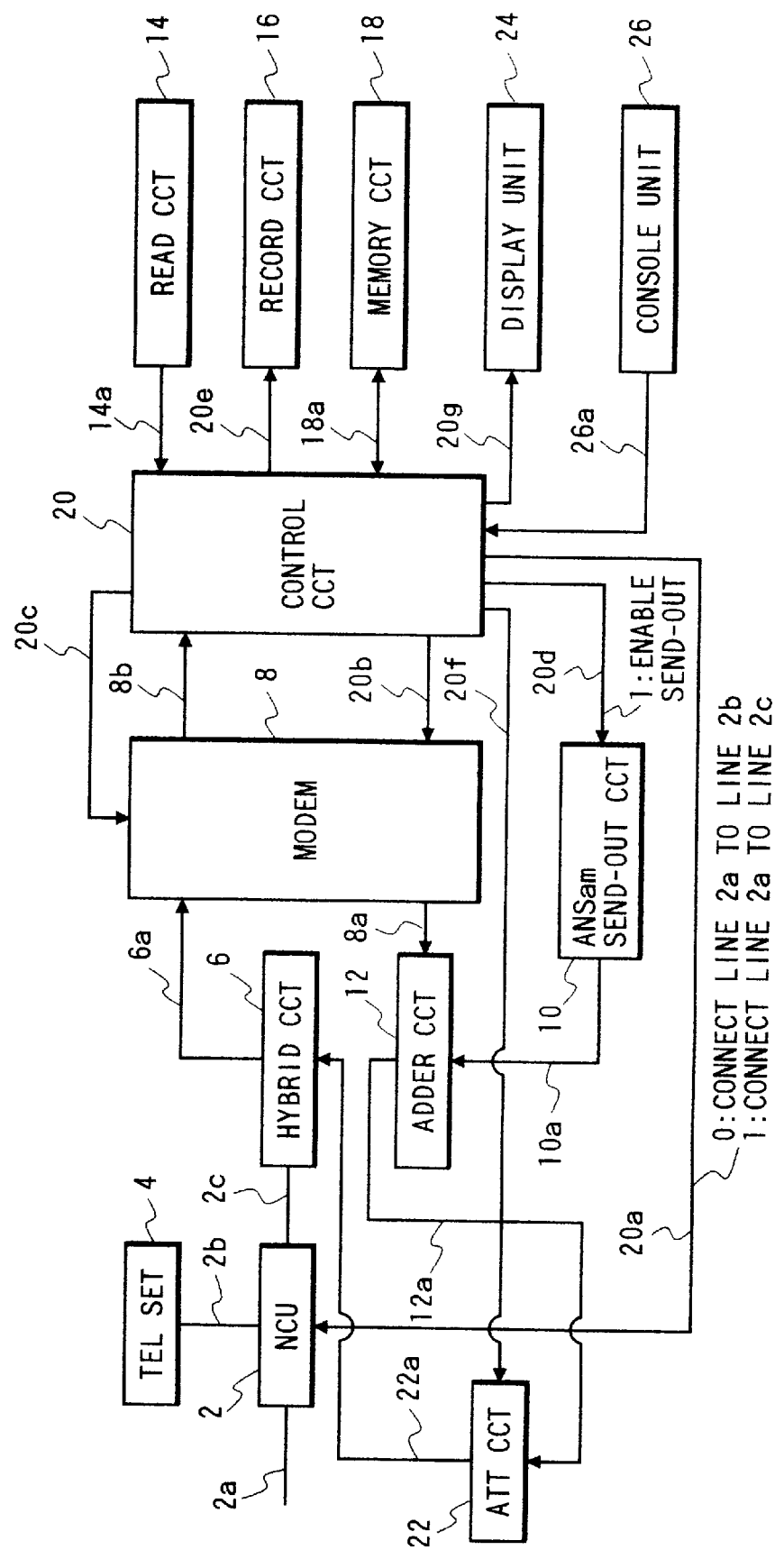
FIG. 1 shows a block diagram of an embodiment of a facsimile apparatus in accordance with the present invention.

FIG. 1 shows a block diagram of an embodiment of the facsimile apparatus of the present invention.

Numeral 2 denotes an NCU (network control unit) which connects a telephone line to a terminal in order to use the line for data communication, controls the connection of a telephone switching network, switches to a data communication line and maintains a loop. When a signal level (signal line 20a) from a control circuit 20 is "0", the NCU 2 connects a telephone line 2a to a telephone set 4, and when the signal level is "1", it connects the telephone line 2a to a facsimile apparatus. In a normal state, the telephone line 2a is connected to the telephone set 4.

Numeral 4 denotes the telephone set.

Numeral 6 denotes a hybrid circuit which separates H=a transmission channel signal and the receiving channel signal, sends a transmission signal from an attenuation circuit 22 to the telephone line 2a through the NCU 2, receives a signal from a partner station through the NCU 2 and sends it to a modem 8 through a signal line 6a.

Numeral 8 denotes the modem which conducts the modulation and the demodulation in accordance with the ITU-T Recommendation V.8, V.21, V.27ter, V.29, V.17 and V.34. The transmission mode is designated by a signal line 20c. The modem 8 receives a signal outputted on a signal line 20b, outputs modulated data to a signal line 8a, receives a received signal outputted on the signal line 6a and outputs demodulated data to a signal line 8b. The modem 8 outputs a signal of 0 dBm as a mean power.

Numeral 10 denotes a circuit for sending an ANSam signal. When a signal of a signal level "1" is outputted to a signal line 20d, it sends the ANSam signal to a signal line 10a, and when a signal of a signal level "0" is outputted to the signal line 20d, it outputs no signal to the signal line 10a.

Numeral 12 denotes an adder circuit which receives information on the signal line 8a and information on the signal line 10a and outputs a sum thereof to a signal line 12a.

Numeral 14 denotes a read circuit which outputs read data to a signal line 14a.

Numeral 16 denotes a record circuit which records information outputted on a signal line 20e line by line.

Numeral 18 denotes a memory circuit which stores raw information or coded information of the read data and stores received information or coded information.

Numeral 22 denotes an attenuation circuit which receives information outputted on the signal line 12a and outputs a signal which is attenuated in accordance with the dB value outputted on a signal line 20f, to a signal line 22a.

Numeral 24 denotes a circuit for receiving information outputted on a signal line 20g and displaying it.

Numeral 26 denotes a console unit which includes one-touch dials, short cut dials, a ten-key, a start key, keyboard of a personal computer and other function keys, information of the depressed key is outputted to a signal line 26a.

A specific example of the V.34 half-duplex communication is now explained.

Figure 2:
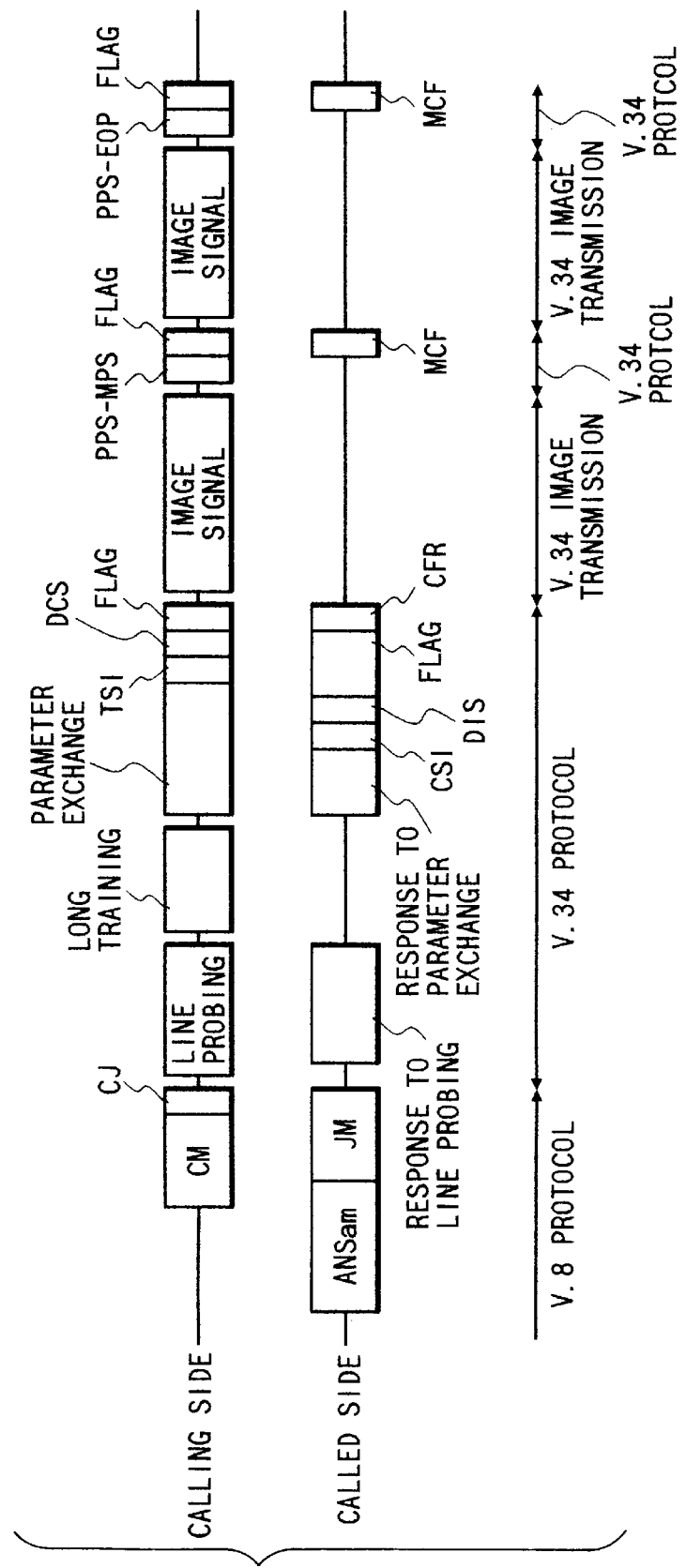
FIG. 2 shows a specific example of the V.34 half-duplex communication.

Referring to FIG. 2, a signal (ANSam (a signal derived by modulating 2100 Hz with 15 Hz)) to enable the full-duplex communication is sent from a called station in accordance with the V.8 communication procedures (full-duplex). The calling station sends a CM signal by the V.8 modulation to inform a transmissible mode for image transmission to the receiver. On the other hand, after the reception of the CM Signal, the called station informs receivable transmission modes at the called station among the transmission modes designated by the CM signal, to the transmitter by a JM signal. After the reception of the JM signal, the calling station sends a CJ signal to inform the transmission mode to the receiver.

In accordance with the V.34 communication procedures after 50 ms elapse from the transmission of the CJ signal the transmitter sends a line probing signal (INFO0c at the top) to check a status of the telephone line, the receiver sends a signal (INFO0a at the top) to respond the line probing signal to inform subsequent send level, amplitude level correction and transmission band rate to the transmitter.

After 50 ms elapse from the transmission of the line probing signal, the transmitter sends a long training signal, and the receiver conducts the adjustment of an equalizer of the modem and the timing detection in accordance with the long training signal.

After 50 ms elapse from the long training signal, the transmitter sends a parameter exchange signal and the receiver sends a signal in response to the parameter exchange signal to inform subsequent ink correction and bit rate to the transmitter. Following to the parameter exchange response signal, the receiver sends CSI and DIS signals, sends a flag signal unit it receives TSI and DCS signals, and after the reception of the TSI and DCS signals, it sends a CFR signal. After the reception of the CSI and DIS signals, the transmitter sends the TSI and DCS signals and sends a flag signal until it receives the CFR signal.

After 50 ms elapse from the transmission of the flag signal, the transmitter sends an image signal, and after 50 ms elapse from the completion of the transmission of the image signal, it sends a PPS-MPS signal and sends a flag signal until it receives an MCF signal. After the reception of the PPS-MPS signal, the receiver sends the MCF signal. After 50 ms elapse from the transmission of the flag signal, the transmitter sends the image signal, and after 50 ms elapse from the completion of the transmission of the image signal, it sends a PPS-EOP signal and sends a flag signal until it receives the MCF signal. After the reception of the PPS-EOP signal, the receiver sends the MCF signal.

In the V.34 half-duplex communication, after the reception of the line probing signal, the receiver informs to the transmitter the power suppression amount by the INFOh (detail of which will be described in conjunction with FIGS. 11 and 12) by the line probing response signal. On the other hand, in the V.34 full-duplex communication, after the reception of the line probing signal, the calling station designates the power suppression amount to the called station by INFO1c by the line probing response signal, and after the reception of the line probing signal, the called station designates the power suppression amount to the calling station by the INFO1a by the line probing response signal.

According to a control by the control circuit 20 of FIG. 1, when the transmission is selected in the facsimile apparatus having the V.34 half-duplex communication means, the power suppression amount information informed from the receiver to the transmitter is disregarded not so as to suppress the power, and when the reception is selected no power suppression amount to be informed from the receiver to the transmitter is designated.

Figure 3:
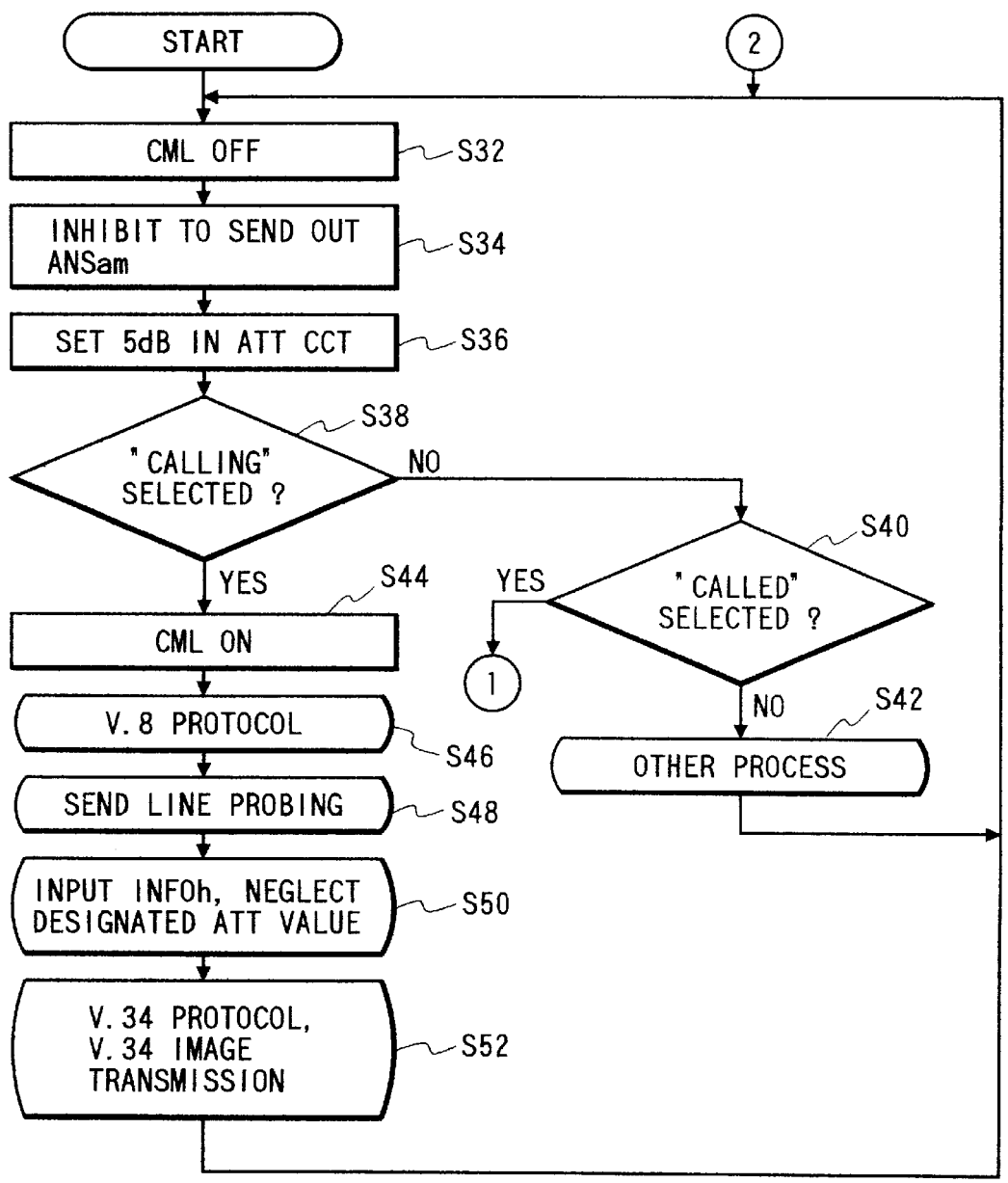
FIG. 3 shows a flow chart of control of the control circuit 20 of FIG. 1.
Figure 4:
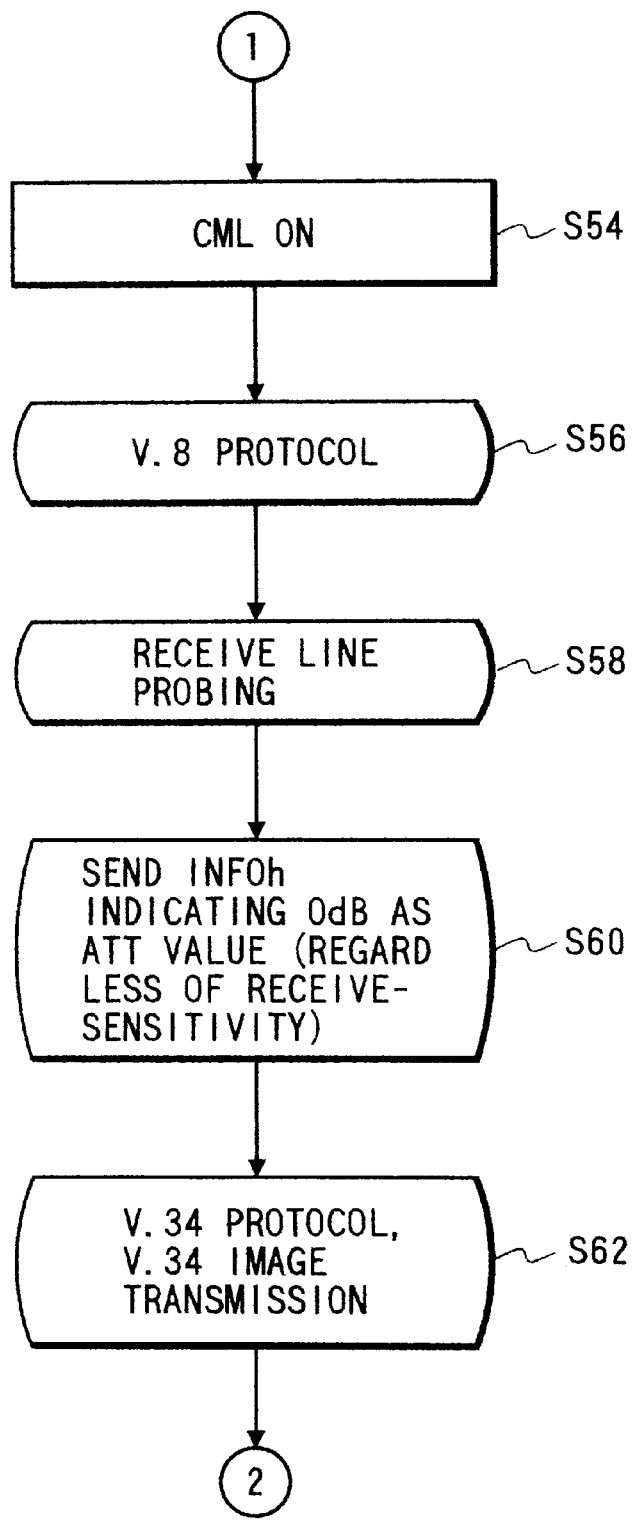
FIG. 4 shows a flow chart of control of the control circuit 20 of FIG. 1.

FIGS. 3 and 4 show flow charts of control of the control circuit 20 of FIG. 1.

In S32, a signal of a signal level "0" is outputted to the signal line 20a to turn on a CML.

In S34, a signal of a signal level "0" is outputted to the signal line to send no ANSam signal.

In S36, a signal "5" is outputted to the signal line 20f to set the attenuation circuit 22 to 5 dB so that a mean power of −5 dBm is outputted to the signal line 2a.

In S38 and S40, whether the call (or the called) gois selected or not is determined, and if the call is selected, the process proceeds to S44, and if the called is selected, the process proceeds to S54. If neither one is selected, the process proceeds to S42 to conduct other process.

In S44, a signal of a signal level "1" is outputted to the signal line 20a to turn on the CML.

In S46, the V.8 procedures are conducted, and in S48, the line probing signal is sent.

In S50, information of INFOh sent from the receiver is received.

The INFOh can designate the power suppression amount and the designation from the receiver, if any, is disregarded and the setting of the attenuation circuit 22 is not changed.

S52 represents the V.34 procedures and the image transmission in the V.34 procedures.

In S54, a signal of a signal level "1" is outputted to the signal line 20a to turn on the CML.

In S56, the V.8 procedures are conducted, and in S58, the line probing signal is received.

In S60, the INFOh which sets the power suppression amount to 0 dB without regard to the reception level is sent and no power suppression is designated. Thus, high speed reception is enabled.

S62 represents the V.34 procedures and the image transmission in the V.34 procedures.

[Embodiment 2]

In the Embodiment 1, only the V.34 half-duplex communication was considered. In the present embodiment, a facsimile apparatus which can also conduct the V.34 full-duplex communication is considered.

In a facsimile apparatus having the V.34 half-duplex communication means and the V.34 full-duplex communication means, when the transmission is selected and the power suppression amount information is informed from the receiver to the transmitter, it is disregarded in the V.34 half-duplex communication and the power suppression is not conducted, and the designated power suppression is conducted in the V.34 full-duplex communication. When the reception is selected, the power suppression amount to be informed from the receiver to the transmitter is none in the V.34 half-duplex communication, and in the V.34 full-duplex communication, the power suppression amount is designated to attain a minimum receivable transmission level. The control circuit 20 of FIG. 1 mainly conducts the above control.

Figure 5:
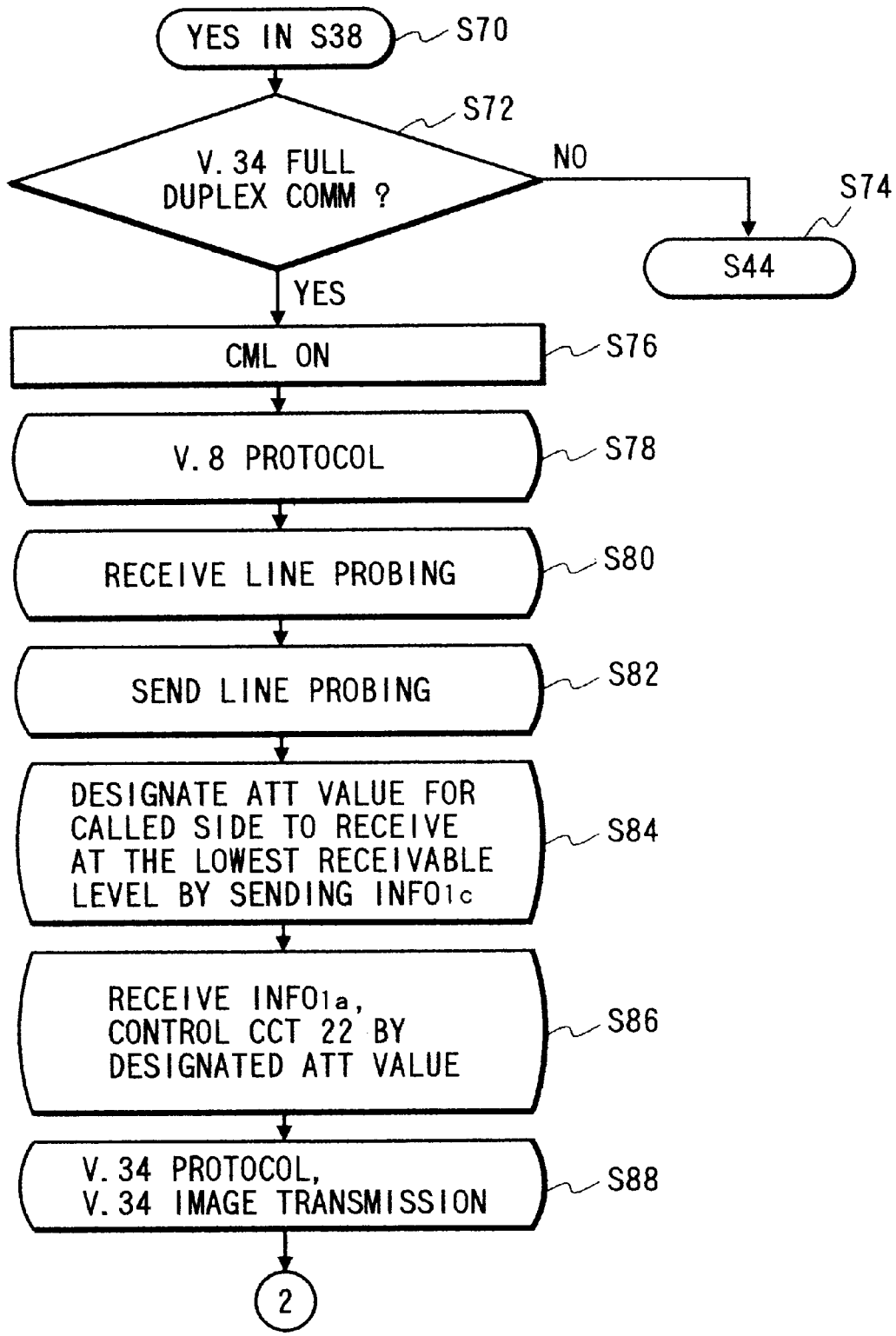
FIG. 5 shows a flow chart of control of the control circuit 20 of FIG. 1.
Figure 6:
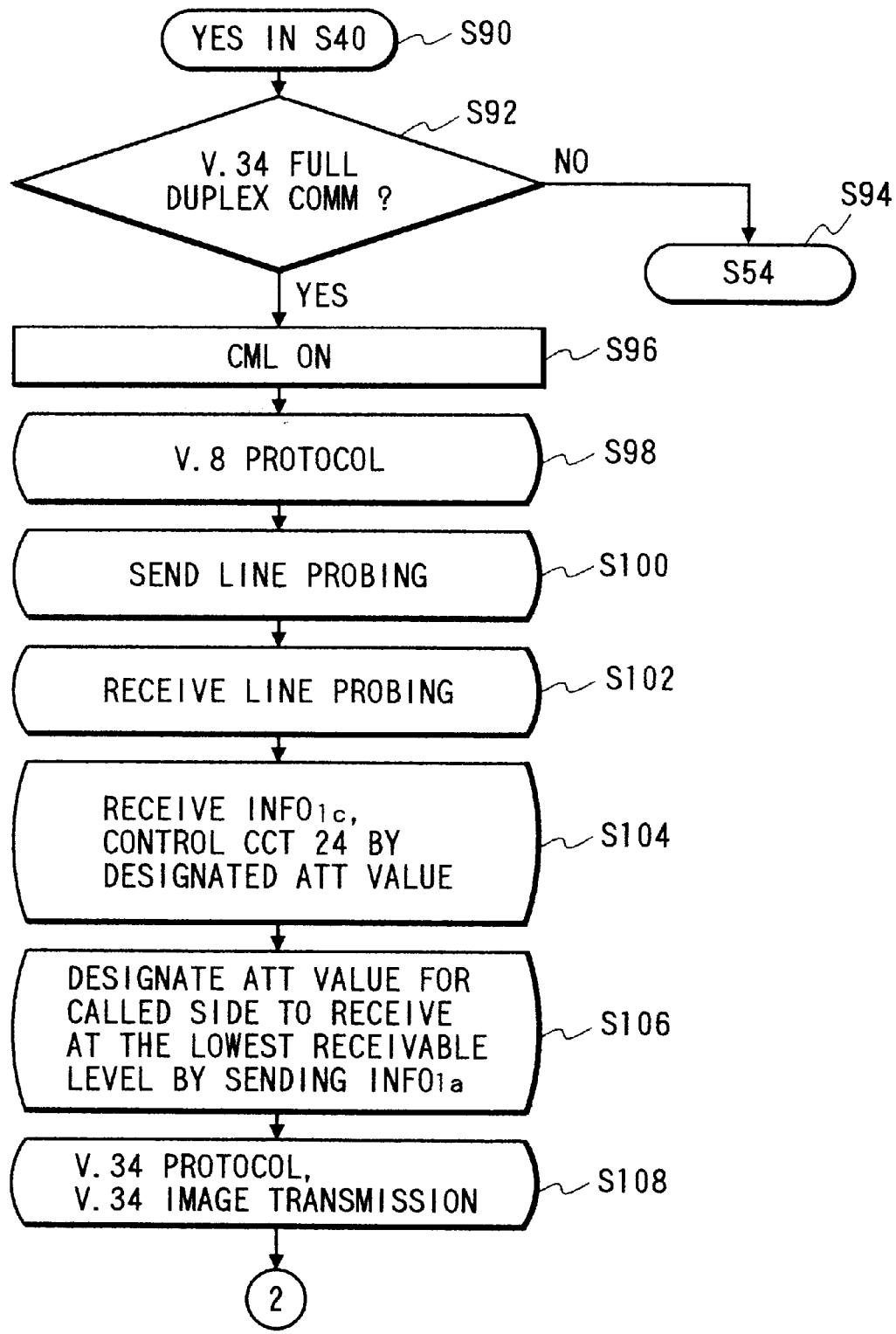
FIG. 6 shows a flow chart of control of the control circuit 20 of FIG. 1.

FIGS. 5 and 6 show flow charts of control for different portions from those of FIGS. 3 and 4.

In FIG. 5, S70 represents Yes in S38.

In S72, information on the signal line 26a is received and whether the V.34 full-duplex communication has been selected or not is determined. If the V.34 full-duplex communication is selected, the process proceeds to S76, and if the V.34 half-duplex communication is selected, the process proceeds to S74 (S44).

In S76, a signal of a signal level "1" is outputted to the signal line 20a to turn on the CML.

S78 represents the V.8 procedures, S80 represents the reception of the line probing signal and S82 represents the transmission of the line probing signal.

In S84, in response to the reception of the line probing signal, the power suppression amount is determined such that the transmission at the lowest receivable level is attained, and this information is designated to the called station by sending INFO1c.

S86 represents the reception of the INFO1a. When the power suppression amount is designated thereby, the attenuation amount is set by the circuit 22.

S88 represents the V.34 procedures and the V.34 full-duplex image transmission.

S90 represents Yes in S40.

In S92, the information on the signal line 26a is received to determine whether the V.34 full-duplex communication has been selected or not. If the V.34 full-duplex communication is selected, the process proceeds to S96, and if the V.34 half-duplex communication is selected, the process proceeds to S94 (S54).

In S96, a signal of a signal level "1" is outputted to the signal line 20a to turn on the CML.

S98 represents the V.8 procedures, S100 represents the transmission of the line probing signal, and S102 represents the reception of the line probing signal.

S104 represents the reception of the INFOc. When the power attenuation amount is designated thereby, the attenuation amount is set by the circuit 22.

In S106, in response to the reception of the line probing signal, the power suppression amount is determined such that the transmission at the lowest receivable level is attained and this information is designated to the calling station by sending the INFO1a.

S108 represents the V.34 procedures and the V.34 full-duplex image transmission.

So far, it has been described that the power suppression amount of the transmission signal is designated by the INFOh in the half-duplex V.34 modem, and in the full-duplex V.34 modem, by the INFO1c from the calling station to the called station and by the INFO1a from the called station to the calling station.

A method for designating the power suppression amount of the transmission signal of the receiver by using the line probing signal is now explained.

Figure 7:
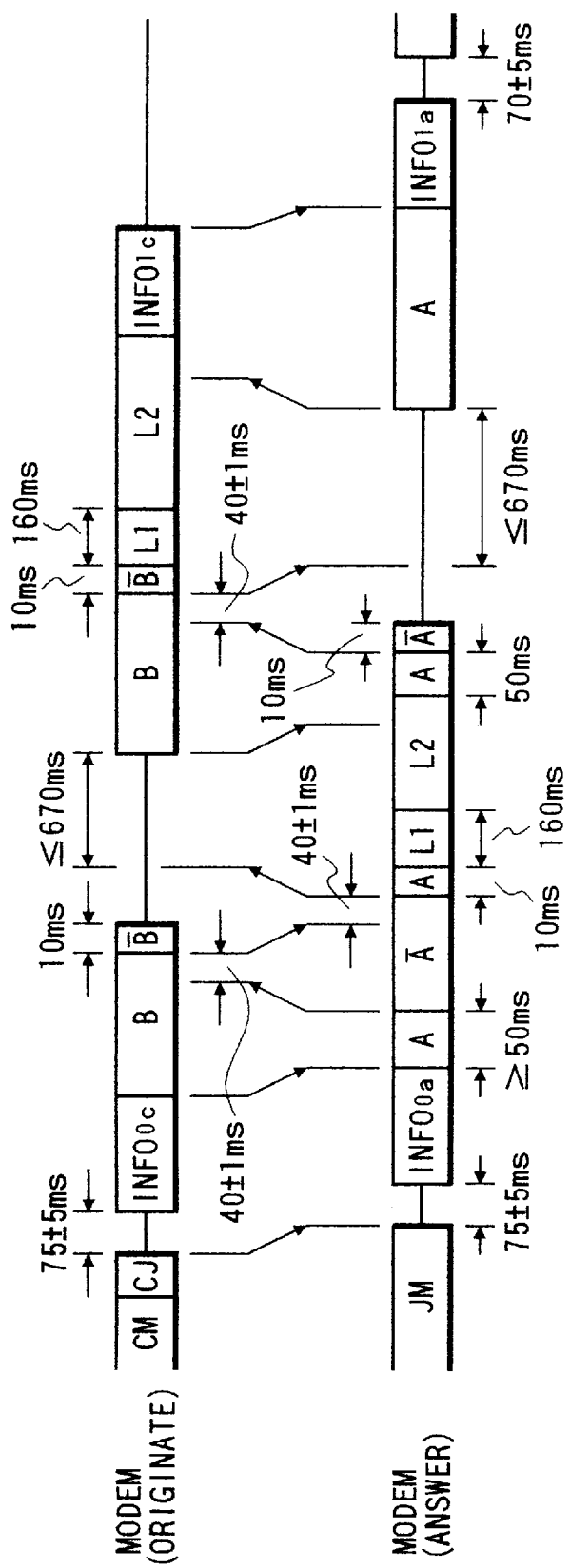
FIG. 7 shows procedures of the V.34.

FIG. 7 shows procedures to determine the power suppression amount of the full-duplex V.34.

In FIG. 7, the INFO sequence is used to exchange a modem capability, a line probing result and data mode modulation parameters. Two sets of INFO sequences (INFO0a and INFO0c) and (INFO1a and INFO1c) are used.

The INFO0 sequence is shown in FIGS. 8A and 8B, the INFO1c sequence is shown in FIGS. 9A and 9B and the INFO1a sequence is shown in FIGS. 10A and 10B.

In the INFO0, bit 20 is significant and in the INFO1c and INFO1a, bits 12 to 14 are significant. Since the full-duplex V.34 communication is considered here, an ability of suppressing the transmission power to a steady setting or lower is declared by the INFO0, and the power suppression designated by the INFO1c and the INFO1a is conducted for the transmission.

A tone A is a tone of 2400 Hz sent from an answer modem and the transition from A to $\overline{A}$ or from $\overline{A}$ to A is the 180° phase inversion of the 2400 Hz tone.

A tone B is a tone of 1200 Hz sent from an originate-modem and the transition from B to $\overline{B}$ or from $\overline{B}$ to B is the 180° phase inversion of the 1200 Hz tone.

Two line probing signals L1 and L2 are used to analyze a channel characteristic.

Figure 11:
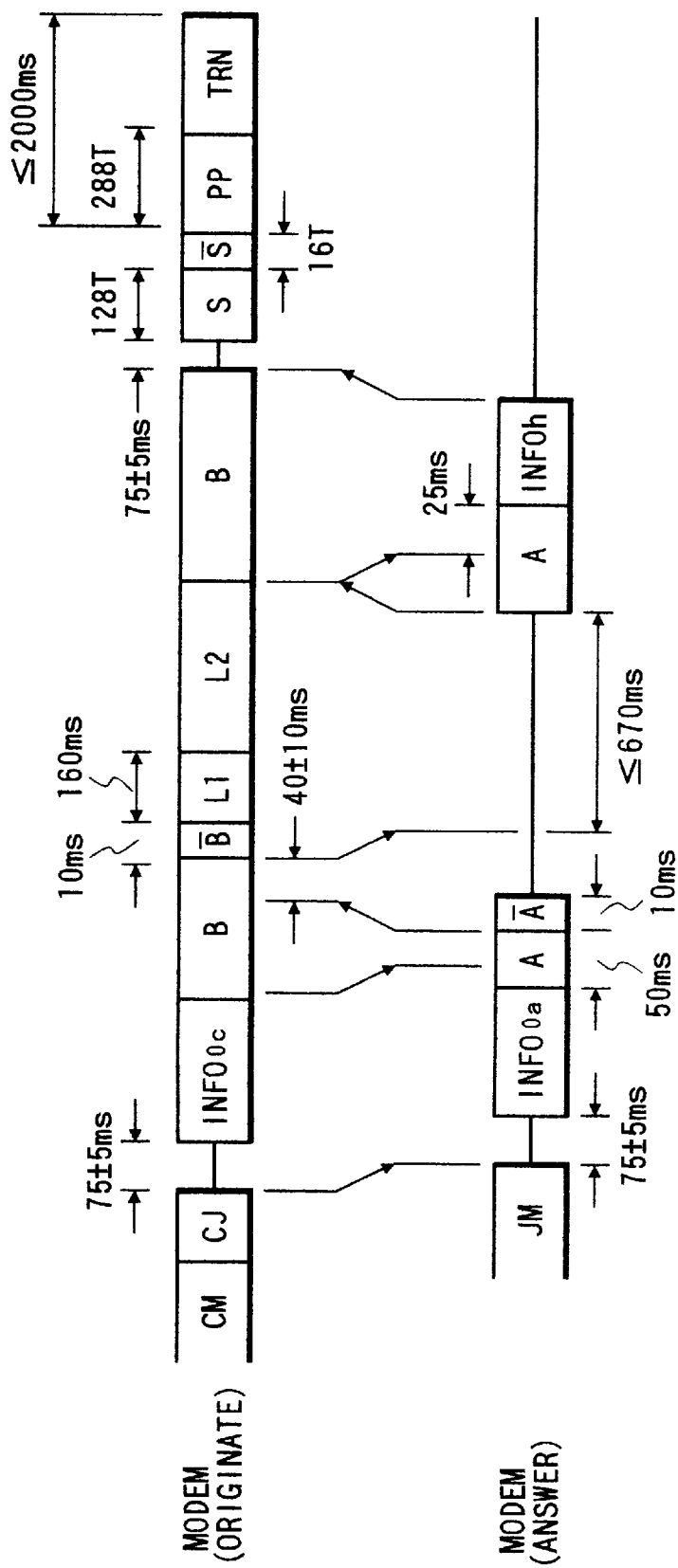
FIG. 11 shows procedures of the V.34.

Procedures to determine the half-duplex V.34 power suppression amount are shown in FIG. 11.

In FIG. 11, INFOh sequence is shown in FIG. 12.

ISince the half-duplex V.34 communication is considered, the bit 20 is set to 0 in the INFO0a and the INFO0c to declare no ability to suppress the transmission power to the steady setting or lower, and even if the power suppression amount is designated by the bits 12 to 14 of the INFOh, it is disregarded and the transmission level is not lowered.

In accordance with the present invention, in the V.34 half-duplex communication, the transmitter does not lower the transmission level by the designation from the receiver so that the high speed transmission in the half-duplex communication is secured.

Further, in accordance with the present invention, the designation to lower the transmission level from the receiver is not conducted in the V.34 half-duplex communication and the high speed transmission is secured.

In the V.34 full-duplex communication, it is necessary in a transmitter to discriminately receive the turn-around of a signal sent by itself and a received signal from a partner station by an echo canceller, so it is required a transmission signal level is minimized as much as possible. The present invention can satisfy this requirement. In the V.34 half-duplex communication, since one-way communication is needed, it is required that the transmission level is set as high as possible to gain an S/N ratio. The present invention can satisfy this requirement, too.

Further, in the V.34 full-duplex communication it is necessary in a receiver to discriminately receive the turn-around of a signal sent by itself and a received signal from a partner station by an echo canceller, it is required that a transmission signal level is suppressed as low as possible. The present invention can meet this requirement. In the V.34 half-duplex communication, since one-way communication is needed, it is required that the transmission level is set as high as possible to gain the S/N ratio. The present invention can meet this requirement, too.

What is claimed is:

1. A facsimile apparatus having a transmitting side and a receiving side for communicating in the ITU-T Recommendation V.34 half-duplex procedures, the transmitting side comprising:

detection means for detecting information informed by the receiving side indicating the amount of power suppression to be conducted on a transmission signal when the transmission signal is to be transmitted by the transmitting side; and means for always disregarding the detected power suppression information and thereby not conducting any power suppression on the transmission signal in the V.34 half-duplex procedure.

2. A facsimile apparatus having a transmitting side and a receiving side for communicating in the ITU-T Recommendation V.34 half-duplex procedures, the receiving side comprising:

inform means for informing the transmitting side of an amount of power suppression to be conducted on a transmission signal when the transmission signal is transmitted by the transmitting side; and means for always causing said inform means to inform the transmitting side that power suppression is not to be conducted on the transmission signal in the V.34 half-duplex procedure.

3. A facsimile apparatus having a transmitting side and a receiving side for communicating in the ITU-T Recommendation V.34 half-duplex procedures and V.34 full-duplex procedures, the transmitting side comprising:

detection means for detecting information informed by the receiving side indicating the amount of power suppression to be conducted on a transmission signal when the transmission signal is to be transmitted by the transmitting side; and means for disregarding the detected power suppression information and thereby not conducting any power suppression in accordance with the transmission of the transmission signal in the V.34 half-duplex procedures, and for conducting power suppression in accordance with the detected power suppression information in accordance with the transmission of the transmission signal in the V.34 full-duplex procedures.

4. A facsimile apparatus having a transmitting side and a receiving side for communicating in the ITU-T Recommendation V.34 half-duplex procedures and V.34 full-duplex procedures, the receiving side comprising:

inform means for informing the transmitting side of an amount of power suppression to be conducted on a transmission signal when the transmission signal is transmitted by the transmitting side; and means for causing said inform means to inform the transmitting side that power suppression is not to be conducted on the transmission signal in accordance with the reception of the transmission signal in the V.34 half-duplex procedures and for causing said inform means to inform the transmitting side of the power suppression amount corresponding to a lowest receivable transmission level in accordance with the reception of the transmission signal in the V.34 full-duplex procedures.

* * * * *

UNITED STATES PATENT AND TRADEMARK OFFICE
CERTIFICATE OF CORRECTION

PATENT NO.  : 6,088,129

DATED       : July 11, 2000

INVENTOR(S) : TAKEHIRO YOSHIDA

Page 1 of 2

It is certified that error appears in the above-identified patent and that said Letters Patent is hereby corrected as shown below:

IN THE DRAWINGS:

Sheet 4 of 15, "(REGARD" should read --(REGARD- --.

COLUMN 1:

Line 31, "slow" should read --slowed--; and
    Line 34, "t attenuate" should read --to attenuate--.

COLUMN 2:

Line 26, "H=a" should read --a--; and
    Line 64, "keys, information" should read --keys; information--.

COLUMN 3:

Line 18, "respond" should read --respond to--;
    Line 32, "unit it" should read --unit from which it--;
    Line 50, "informs to" should read --inform--;
    Line 52, "(detail" should read --(details--; and
    Line 66, "not so as to" should read --so as not to--.

UNITED STATES PATENT AND TRADEMARK OFFICE
CERTIFICATE OF CORRECTION

PATENT NO. : 6,088,129

DATED : July 11, 2000

INVENTOR(S) : TAKEHIRO YOSHIDA

It is certified that error appears in the above-identified patent and that said Letters Patent is hereby corrected as shown below:

COLUMN 4:

Line 11, "gois" should read --is--.

COLUMN 6:

Line 4, "Isince" should read --Since--.

Signed and Sealed this

Seventeenth Day of April, 2001

Attest:

NICHOLAS P. GODICI

*Attesting Officer*    *Acting Director of the United States Patent and Trademark Office*